United States Patent
Myrah et al.

(10) Patent No.: US 8,793,406 B2
(45) Date of Patent: Jul. 29, 2014

(54) SAS SWITCH THAT SUPPORTS BULK DISCOVERY WHEREIN THE BULK DISCOVERY IS EITHER ON A PUSH BASIS OR PULL BASIS

(71) Applicant: Hewlett-Packard Development Company, L.P., Houston, TX (US)

(72) Inventors: Michael G. Myrah, Sammamish, WA (US); Balaji Natrajan, Spring, TX (US); Pruthviraj Herur Puttaiah, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 13/679,013

(22) Filed: Nov. 16, 2012

(65) Prior Publication Data
US 2014/0143453 A1     May 22, 2014

(51) Int. Cl.
*G06F 3/00* (2006.01)
(52) U.S. Cl.
USPC ............... 710/15; 710/16; 710/17; 710/18; 710/19; 710/107; 719/326
(58) Field of Classification Search
USPC ............... 710/15–19, 104; 719/326
See application file for complete search history.

(56) References Cited

U.S. PATENT DOCUMENTS

| 7,401,171 | B2 * | 7/2008 | Slutz et al. | 710/104 |
|---|---|---|---|---|
| 7,917,665 | B1 * | 3/2011 | Booth et al. | 710/15 |
| 8,051,436 | B2 | 11/2011 | Jones | |
| 8,077,605 | B2 | 12/2011 | McCarty et al. | |
| 8,200,872 | B2 * | 6/2012 | Johnson et al. | 710/104 |
| 2012/0173840 | A1 | 7/2012 | Patel et al. | |

OTHER PUBLICATIONS

Vasudeva, Anil. IMEX Research. The Rise of SAS as NextGen Data Storage.

* cited by examiner

*Primary Examiner* — Tammara Peyton
(74) *Attorney, Agent, or Firm* — Aamir Haq

(57) ABSTRACT

An example disclosed is directed to a switch. The switch includes a communication interface and a discovery module. The discovery module is to receive a registration request for bulk discovery from an initiator device via the communication interface. The discovery module is further to receive a change indication specifying that a change has occurred in a fabric associated with the switch, and update a data model based on the received change indication to generate an updated data model. The discovery module then filters the updated data model to generate a filtered data model, and sends the filtered data model to the initiator device via the communication interface.

17 Claims, 4 Drawing Sheets

SAS SWITCH THAT SUPPORTS BULK DISCOVERY WHEREIN THE BULK DISCOVERY IS EITHER ON A PUSH BASIS OR PULL BASIS

BACKGROUND

A switched fabric is a network topology where multiple network nodes are connected to one another via one or more network switches and one or more physical links. For example, in the context of a large serial attached SCSI (SAS) storage network, multiple initiator devices may connect with multiple target devices via one or more SAS switches and one or more corresponding physical links. The initiator devices may be, for example, host bus adapters (HBAs), SAS controllers, or other data storage controllers, and the target devices may be, for example, SAS hard disk drives, serial ATA (SATA) hard disk drives, solid state disks (SSDs), JBODs, and/or SAS tape drives. Each SAS switch may comprise an expander and a zone manager, and may forward data received from the initiator devices to the target devices, and, conversely, forward data received from the target devices to the initiator devices. Such forwarding may be accomplished based at least in part on the SAS switch's data model or network topology map, which may specify a mapping between the various network nodes, and which may be created/updated via a fabric discovery process.

BRIEF DESCRIPTION OF THE DRAWINGS

Examples are described in the following detailed description and in reference to the drawings, in which.

DETAILED DESCRIPTION

Figure 1:
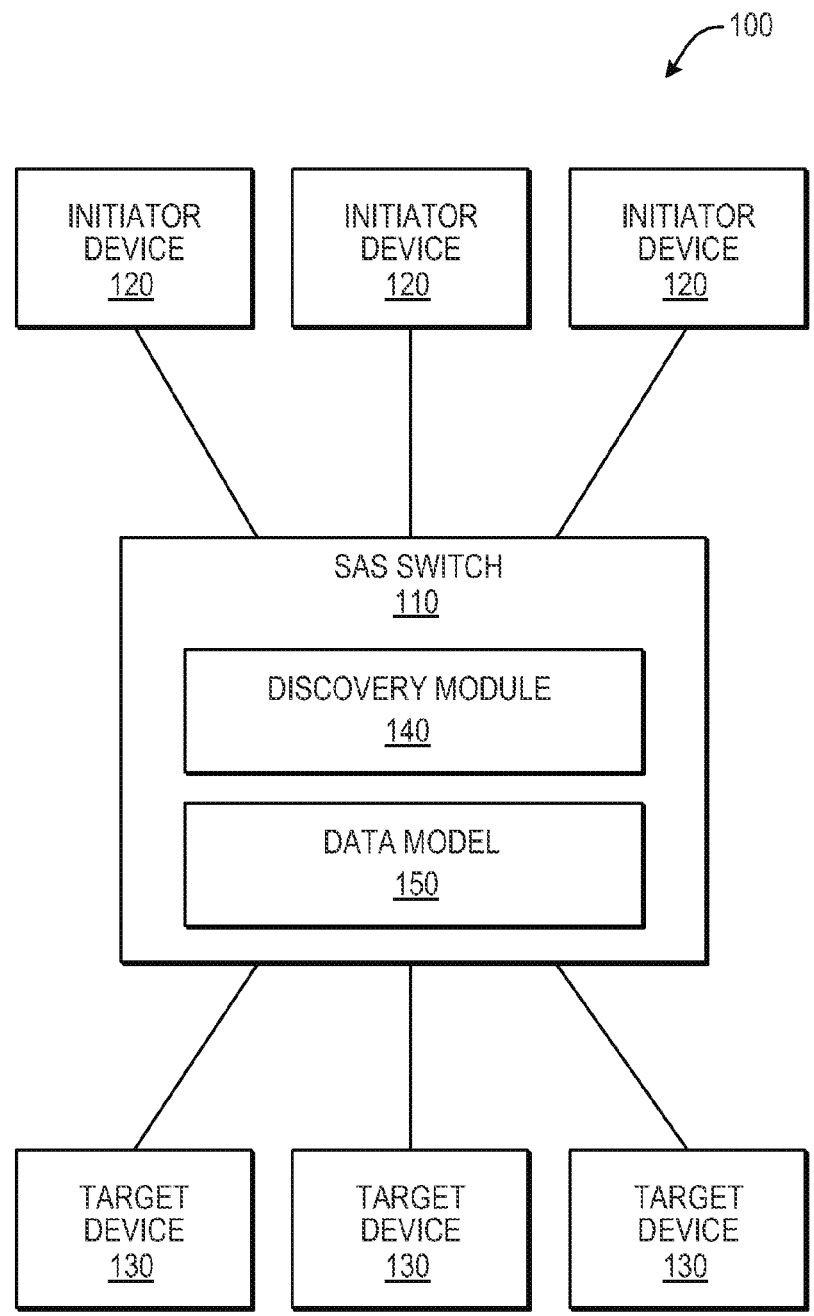
FIG. 1 depicts an example system in accordance with an implementation.

Various aspects of the present disclosure are directed to efficient network topology discovery. More precisely, various aspects of the present disclosure are directed to a novel and previously unforeseen manner by which switches may provide updated and aggregated data models to initiator devices that are registered for bulk discovery.

In current large SAS storage networks, SAS switches may be stacked together (i.e., trunked or daisy-chained together) to enable communication between the SAS switches and the devices in their respective domains. While this stacking approach allows greater access from a given initiator, the stacking dramatically increases the amount of time required to perform discovery. Moreover, the stacking results in multiple serial management protocol (SMP) and/or serial SCSI protocol (SSP) commands from each initiator device to each target device as part of the standard SAS discovery process. This level of traffic, among other things, causes delays and increases the chance of starving out lower priority tasks such as environmental processing.

Aspects of the present disclosure address the above by providing a discovery implementation that may reduce the amount of traffic, reduce the number of interrupts, and/or reduce discovery time. In particular, various implementations may utilize fast bulk discovery of a SAS fabric with zone based filtering to achieve various advances. When compared to conventional approaches, this implementation alleviates the need for an initiator device to conduct full discovery of a fabric upon receiving a BROADCAST (CHANGE) primitive by instead obtaining updated and aggregated data models from a switch that the initiator device is registered with for bulk discovery. Moreover, this implementation alleviates the need for the switch to have to automatically and unconditionally re-broadcast BROADCAST (CHANGE) primitives to all initiator devices in response to receiving such broadcast primitives from target devices. These benefits along with other benefits are discussed below with reference to various example implementations and figures.

In one example implementation, a discovery process if provided. The process comprises receiving, at a SAS switch and from an initiator device, a registration request for bulk discovery, where the bulk discovery is either on a push basis or pull basis. The SAS switch may then receive a change indication (e.g., a BROADCAST (CHANGE) primitive) specifying that a change has occurred in a SAS fabric associated with the SAS switch, and update a data model based on the received change indication. Thereafter, if the initiator device is registered for bulk discovery on a push basis, the SAS switch may filter the updated data model and send the filtered data model to the initiator device. Alternatively, if the initiator device is registered for bulk discovery on a pull basis, the SAS switch may send the change indication to the initiator device, receive a request for the updated data model from the initiator device, filter the updated data model, and send the filtered data model to the initiator device.

In another example implementation, a switch is provided. The switch comprises a communication interface and a discovery module. The discovery module is to receive a registration request for bulk discovery from an initiator device via the communication interface. The discovery module is further to receive a change indication specifying that a change has occurred in a fabric associated with the switch, and update a data model based on the received change indication to generate an updated data model. The discovery module then filters the updated data model to generate a filtered data model specifically matched and optimized for the registered initiator device, and sends the filtered data model to the initiator device via the communication interface.

In a further example implementation, a non-transitory computer readable medium is provided. The non-transitory computer-readable medium comprises instructions which, when executed, cause a switch to receive a change indication specifying that a change has occurred in a fabric associated with the switch, and update a data model based on the received change indication to generate an updated data model. The instructions then cause the switch to filter the updated data model to generate a filtered data model by filtering out portions of the updated data model that an initiator device is not permitted to obtain, wherein the initiator device is registered with the switch for bulk discovery. Thereafter, the instructions cause the switch to send the filtered data model to the initiator device.

FIG. 1 depicts an example system 100 in accordance with an implementation. It should be readily apparent that the system 100 represents a generalized illustration and that other elements may be added or existing elements may be removed, modified, or rearranged without departing from the scope of the present disclosure. For example, while the system 100 depicted in FIG. 1 includes only one SAS switch 110, the system may actually comprise a plurality of SAS switches, and only one has been shown and described for simplicity.

The system 100 comprises a SAS switch 110, a plurality of initiator devices 120, and a plurality of target devices 130. The initiator devices 120 may be, for example, host bus adapters (HBAs), SAS controllers, and/or other data storage controllers. These devices may have multiple ports for connection to internal and/or external targets, where each port may have a single physical link (a narrow port) or 2, 4, or 8 physical links (a wide port). The initiator device may provide input/output (I/O) processing and physical connectivity between a server and a storage device. In particular, the initiator device may originate device service and task management requests for processing by a target device and receive responses for the same requests from the target device. The initiator devices may be provided as an on-board component on the motherboard (e.g., a server oriented motherboard) or as an add-on component.

The target devices 130 may be, for example, SAS hard disk drives, serial ATA (SATA) hard disk drives, solid state disks (SSD). SAS tape drives, JBODs, and/or a hybrid drives. These devices may be end devices comprising logical units and target ports that receive device service and task management requests for processing and send responses to the requests to the initiator devices.

The SAS switch 110 may interconnect the initiator devices 120 and the target devices 130 via physical links, and forward data received from the initiator devices 120 to the target devices 130, and, conversely, forward data received from the target devices 130 to the initiator devices 120. In some implementations, there may be a plurality of SAS switches 110 stacked together (i.e., trunked or daisy chained) via physical links to enable communication between the switches and devices in their respective domains. The connection therebetween may be made via a trunk line that connects ports of the respective switches.

The SAS switch 110 may comprise an expander and a zone manager (not shown). In addition, the switch 110 may comprise a discovery module 140. The discovery module 140 may conduct SAS fabric discovery processes in a manner that, among other things, reduces network traffic and reduces processing time. The discovery module 140 may comprise hardware, software, or a combination of both. For example, in one implementation, the discovery module 140 may comprise at least a processing device and a memory. The processing device may correspond to a device that generally retrieves and executes the instructions stored in the memory (e.g., a central processing unit (CPU), processor, microcontroller, or the like). The memory may correspond to any typical storage device that stores computer-implemented instructions, such as programming code or the like (e.g, a non-volatile memory, a volatile memory, or a storage device). In another implementation, the discovery module 130 may comprise a functionally equivalent circuit such as an application-specific integrated circuit (ASIC).

The switch 110 may also comprise a data model 150. This data model 150 may comprise topology information related to all or a portion of the fabric associated with the switch 110. For example, the data model 150 may specify a mapping between the initiators 120, targets 130, and/or other switches (not shown). Depending on the implementation, the data model 150 may be in the form of, e.g., a tree data structure, a graph, and/or another structure. This data model 150 may be created/updated via a fabric discovery process. For example, the data model 150 may be updated in response to receiving a BROADCAST (CHANGE) primitive triggered by a drive being hot removed/added, a zoning modification, and/or a cabling modification. The data model 150 may be stored on a memory associated with the switch 150. In some implementations, the discovery module 140 comprises the data model 150. In other implementations, the data model is stored in a memory external to and accessible by the discovery module 140. It should be understood that the data model 150 may be referred to herein as a data model, an updated data model, and/or a filtered data model.

Figure 2:
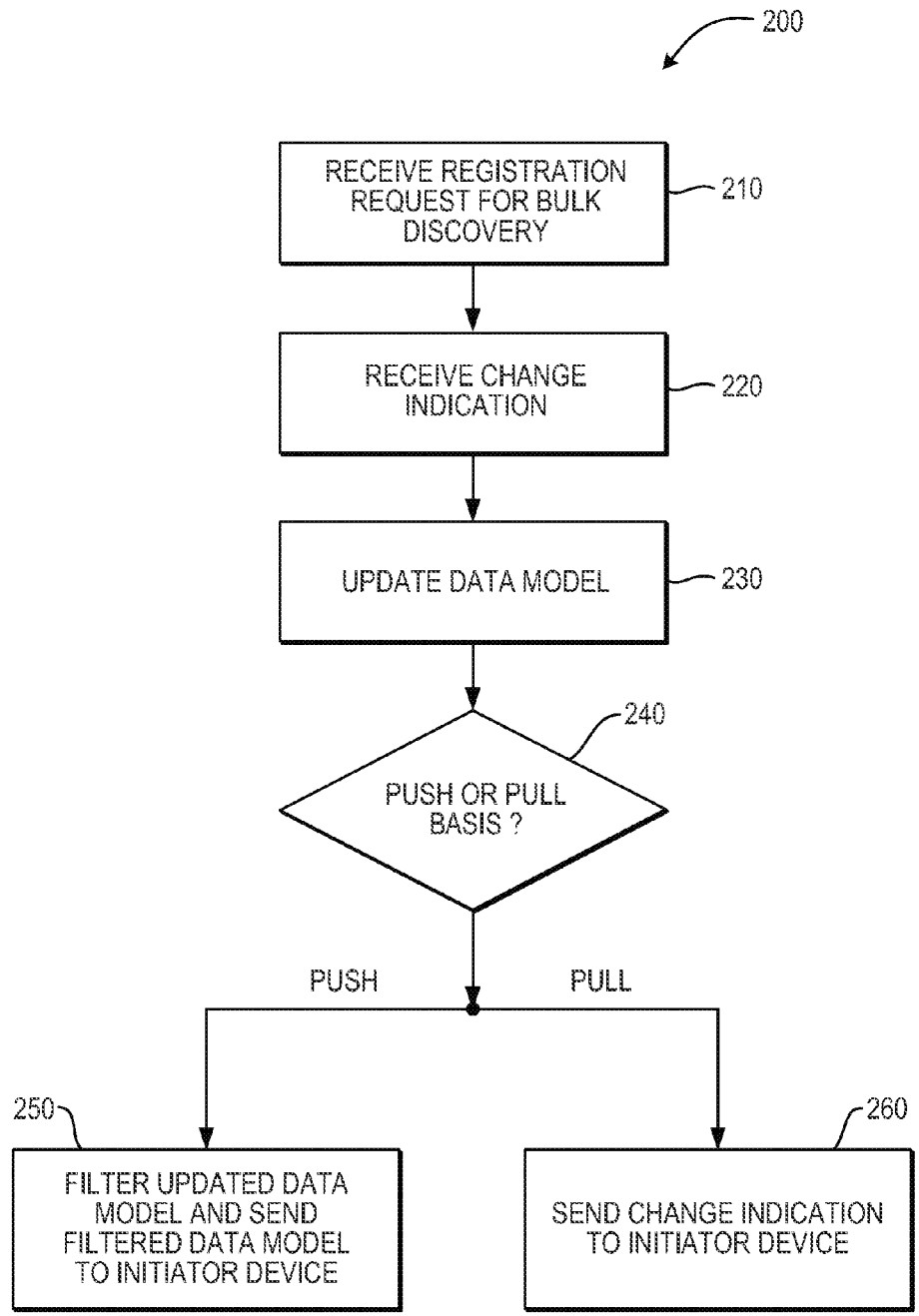
FIG. 2 depicts an example process flow diagram in accordance with an implementation.

Turning now to the operation of the system 100, FIG. 2 depicts an example process flow diagram 200 in accordance with an implementation. It should be readily apparent that the processes depicted in FIG. 2 (as well as FIG. 3) represents generalized illustrations, and that other processes may be added or existing processes may be removed, modified, or rearranged without departing from the scope and spirit of the present disclosure. Further, it should be understood that the processes may represent executable instructions stored on memory that may cause a processing device to respond, to perform actions, to change states, and/or to make decisions. Thus, the described processes may be implemented as executable instructions and/or operations provided by a memory associated with a SAS switch 110. Alternatively or in addition, the processes may represent functions and/or actions performed by functionally equivalent circuits like an analog circuit, a digital signal processing device circuit, an application specific integrated circuit (ASIC), or other logic devices associated with a SAS switch 110. Furthermore, FIG. 2 (as well as FIG. 3) is not intended to limit the implementation of the described implementations, but rather the figure illustrates functional information one skilled in the art could use to design/fabricate circuits, generate software, or use a combination of hardware and software to perform the illustrated processes.

The process 200 may begin at block 210, where the SAS switch 110 receives a registration request for bulk discovery from an initiator device 120. As used herein, bulk discovery refers generally to a large data transfer discovery operation. This differs from non-bulk discovery which typically involves many smaller discovery commands attempting to discover every device in the topology with the commands going from every initiator device to every target device in the system, for example.

The bulk discovery may either be on a push basis or a pull basis. The push basis generally indicates that the switch 110 will write the data model to the initiator device 120 when a fabric change occurs. This may be used for initiator devices that support target mode and allow for sending and receiving commands or being the target thereof. The pull basis generally indicates that the initiator device 120 will read the data model upon receiving a fabric change notification (e.g., a BROADCAST (CHANGE) primitive). This may be used for initiator devices that do not support target mode and allow only for sending commands and not being the target thereof. In some implementations, the switch 110 provides an indication to the initiator device 120 that it supports bulk discovery prior to receiving the registration request for bulk discovery from the initiator device.

At block 220, the SAS switch 110 receives a change indication specifying that a change has occurred in the SAS fabric associated with the switch 110. The change may be, for example, a drive being hot removed/added, a zoning modification, an expander being reset, and/or a cabling modification. In certain implementations, this change indication may comprise a BROADCAST (CHANGE) primitive or another relevant SAS primitive.

At block 230, the SAS switch 110 updates a data model 150 based on the received change indication to produce an updated data model. This update may comprise, for example, editing a stored version of the data model 150, replacing a stored version of the data model 150, and/or storing a new version of the data model 150. After updating a data model, the SAS switch 110 may have an up-to-date topology mapping of the entire fabric.

At block 240, the switch 110 determines if the initiator device is registered for bulk discovery on a push basis or pull basis.

At block 250, if the initiator device 120 is registered for bulk discovery on a push basis, the switch 110 may filter the updated data model 150 to filter out portions of the topology that are not visible to the registered initiator. For example, if the initiator has access to drive bays 1-5 out of 12 in a JBOD, then the switch 110 will filter out the information for drives 6-12 in the updated data model 150. The switch then sends the filtered data model 150 to the initiator device 120. The initiator device 120 may then update its data model based on the received filtered data model.

Alternatively, at block 260, if the initiator device 120 is registered for bulk discovery on a pull basis, the switch 110 sends the change indication to the initiator device 120. Thereafter, the switch 110 may receives a request for the updated data model 150 from the initiator device 120. The switch 110 may then proceed to filter the updated data model, as described above, and send the filtered data model to the initiator device 120. The initiator device 120 may then update its data model based on the received filtered data model.

Accordingly, this process described with respect to FIG. 2 allows an initiator device 120 in a SAS fabric to discover fabric changes with fewer SAS commands than conventional approaches. This is possible at least because the switch 110 has a data model 150 representing the current state of the entire fabric, and the initiator device 120 utilizes bulk discovery to retrieve this updated data model 150 as opposed to having to discover the entire fabric on its own in response to receiving a BROADCAST (CHANGE) primitive. This, in turn, may reduce the SAS discovery time which may result in a better user interface experience with setting up zoning (i.e., less lag between saving zoning data). Moreover, this may reduce time to market by reducing the number of starvation/timing issues a development team may need to resolve for a large SAS fabric based solution.

Figure 3:
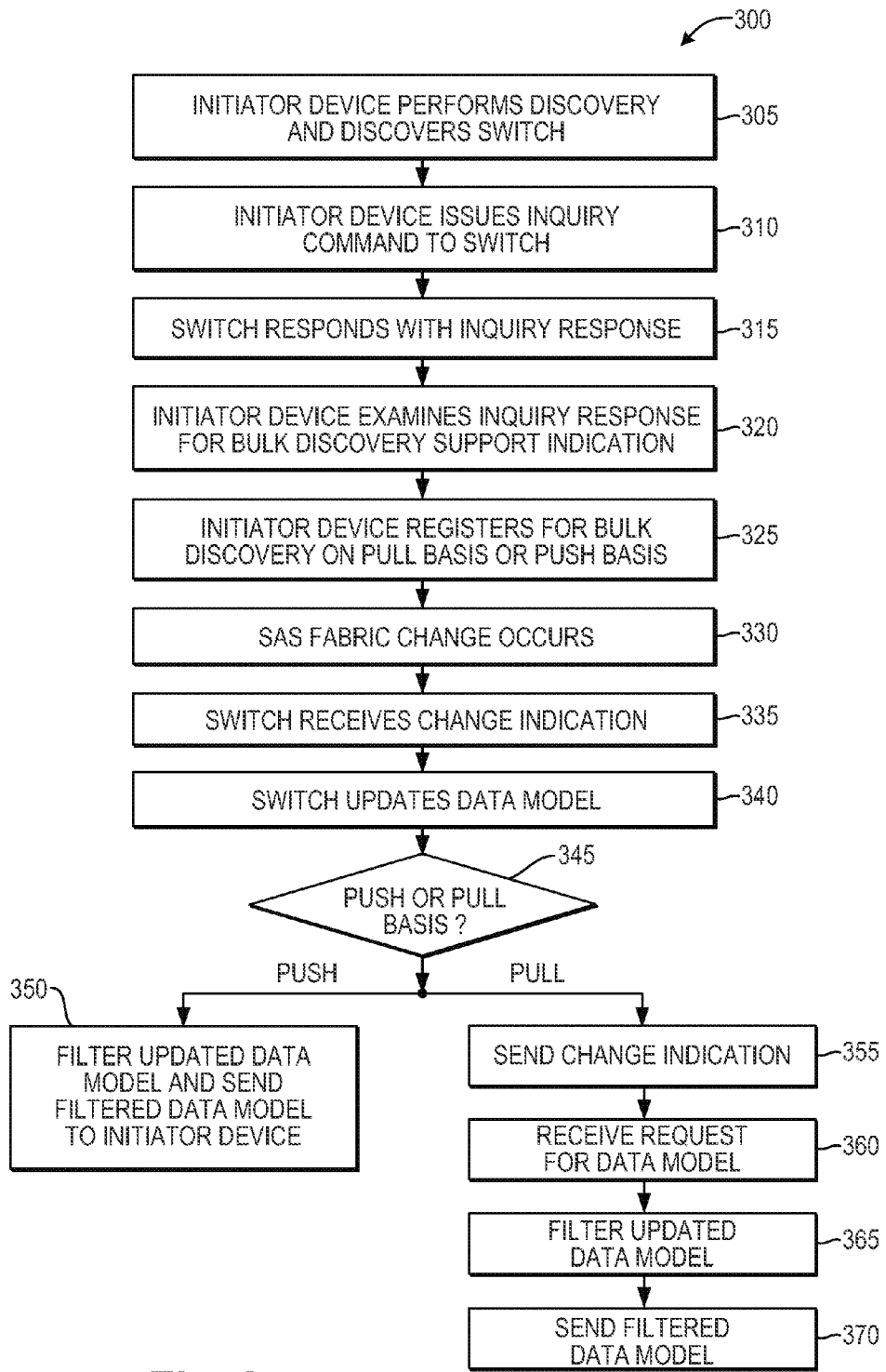
FIG. 3 depicts an example process flow diagram in accordance with another implementation.

FIG. 3 depicts another example process flow diagram 300 in accordance with another implementation. The process 300 may begin at block 305, where an initiator device 120 performs a discovery process and discovers a switch 110. In particular, this process may involve, e.g., establishing whether a neighboring device is present, what type of device it is, what link rates it supports, and/or its SAS address. This process may be conducted, for example, on start-up of the initiator device. Furthermore, in some implementations, the process may result in multiple identified switches 110, among other network devices.

At block 310, after identifying a particular switch 110 or as part of the process of identifying the switch 110, the initiator device 120 issues an inquiry command (e.g., a SSP INQUIRY command) to the switch 110. The inquiry command may, for example, request that information regarding the logical unit and target device be sent to the initiator device. Furthermore, in the event that the initiator device 120 identified multiple switches at block 305, the initiator device 120 may initially issue the inquiry command to the nearest switch 110, and then if necessary issue the command to other switches.

At block 315, in response to receiving the inquiry command, the switch 110 responds with an inquiry response (e.g., a SSP INQUIRY response). The inquiry response may indicate that the switch 110 supports bulk discovery. Bulk discovery may be generally understood as a large data transfer discovery operation. Bulk discovery capability may be indicated in the inquiry response via, for example, a vendor specific bit.

At block 320, the initiator device 120 examines the inquiry response for an indication of bulk discovery capability. For instance, the initiator device 120 may examine the inquiry response to determine if a vendor-specific bit is set for bulk discovery capability. If the initiator device 120 determines the switch does 110 not support bulk discovery, the initiator device 120 may communicate with other identified switches to determine if those switches support bulk discovery. In the event that no identified switches support bulk discovery, the initiator device 120 may utilize a conventional discovery process.

At block 325, in response to determining that a switch 110 supports bulk discovery, the initiator device 120 may register with the switch 110 for bulk discovery. In particular, the initiator device 120 may register for bulk discovery on a push basis or on a pull basis. As mentioned above, push basis generally indicates that the switch 110 will write the data model to the initiator device 120 when a fabric change occurs. This may be used when the initiator device 120 supports target mode. By contrast, pull basis generally indicates that the initiator device 120 will read the data model upon receiving a fabric change notification (e.g., a BROADCAST (CHANGE) primitive). This may be used, for instance, by an initiator device 120 that does not support target mode.

At block 330, a change in the SAS fabric occurs. The change may be, for example, a drive being hot removed/added, a zoning modification, and/or a cabling modification, to name a few.

At block 335, the SAS switch 110 receives a change indication specifying that the change has occurred in the SAS fabric associated with the switch 110. In certain implementations, this change indication may comprise a BROADCAST (CHANGE) primitive or another relevant SAS primitive.

At block 340, the SAS switch 110 updates a data model 150 based on the received change indication to produce an updated data model. This update may comprise, for example, editing a stored version of the data model 150, replacing a stored version of the data model 150, and/or storing a new version of the data model 150.

At block 345, the switch 110 determines if the initiator device 120 is registered for bulk discovery on a push basis or pull basis.

At block 350, if the initiator device 120 is registered for bulk discovery on a push basis, the switch 110 may filter the updated data model 150 to filter out portions of the updated data model that the initiator device is not permitted to obtain. For example, if the initiator has access to drive bays 1-5 out of 12 in a JBOD, then the switch 110 may filter out the information for drives 6-12 in the updated data model 150. The switch then sends the filtered data model 150 to the initiator device 120.

Alternatively, at block 355, if the initiator device 120 is registered for bulk discovery on a pull basis, the switch 110 sends the change indication to the initiator device 120. Thereafter, at block 360, the switch 110 may receive a request for the updated data model 150 from the initiator device 120. The switch 110 may then, at block 365, proceed to filter the updated data model as described above. Thereafter, at block 370, the switch 110 may send the filtered data model to the initiator device 120. The initiator device 120 may then update its internal data model to reflect the current state of the fabric.

In some implementations, the above-mentioned process may also include the switch 110 examining the change to the SAS fabric, and determining if the initiator device 120 is affected by the change to the SAS fabric. The switch 110 may then only send the filtered data model or the change indication to the initiator device(s) if the initiator device(s) is affected by the change to the SAS fabric. Hence, an initiator device 120 that is not influenced by the change to the SAS fabric will not receive the filtered data model or the change indication.

As mentioned above, the process described with respect to FIG. 3 may allow an initiator device 120 in a SAS fabric to discover fabric changes with fewer SAS commands than conventional approaches. This is possible at least because the switch 110 has a data model 150 representing the current state of the fabric, and the initiator device 120 utilizes bulk discovery to retrieve this update data model 150 (either on a push basis or on a pull basis). This, in turn, may reduce the SAS discovery time which results in a better user interface experience with setting up zoning (i.e., less lag between saving zoning data). Moreover, this may reduce time to market by reducing the number of starvation/timing issues a development team needs to resolve for a large SAS fabric based solution. Still further, this may reduce the amount of traffic associated with the discovery process.

Figure 4:
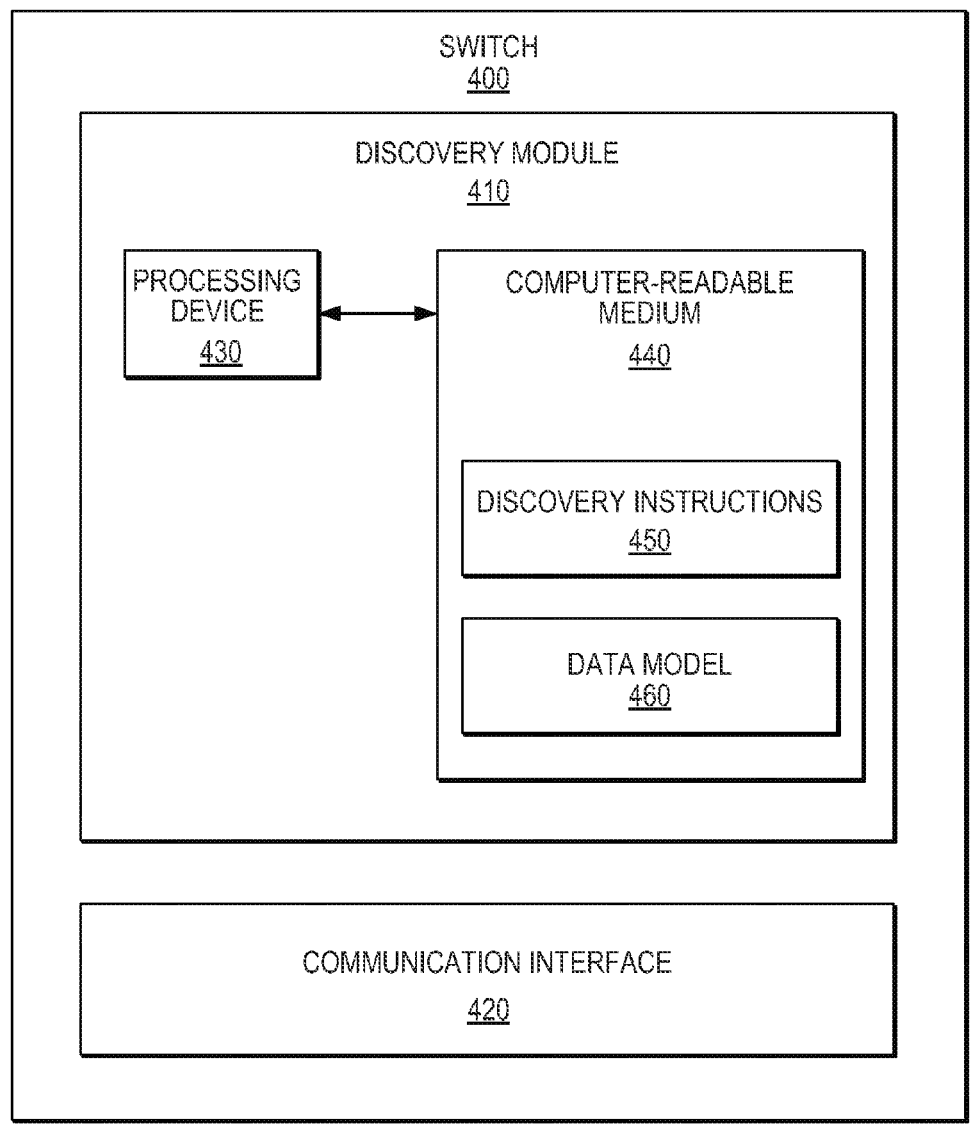
FIG. 4 depicts an example switch in accordance with an implementation.

FIG. 4 depicts an example switch 400 in accordance with an implementation. The switch may comprise a discovery module 410 and a communication interface 420 communicatively coupled to each other. The communication interface 420 may comprise, for example, ports. PHYs, transmitters, receivers, and/or transceivers. The discovery module 410 may comprise a processing device 430 and a non-transitory computer-readable medium 440. The machine-readable medium 440 may comprise discovery instructions 450 that when executed cause the switch to conduct at least the functions described above with respect to FIGS. 1-3. Additionally, the computer-readable medium 440 may comprise a data model 460 that comprises topology information related to all or a portion of the fabric associated with the switch 400.

The computer-readable medium 440 may correspond to any typical storage device that stores machine-readable instructions, such as programming code, software, firmware, or the like. For example, the computer-readable medium 440 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that can be executed by the processing device 430. In this case, the computer-readable medium 440 may be a portable medium such as a CD, DVD, or flash drive or a memory maintained by a server from which the installation package can be downloaded and installed. In another implementation, the instructions may be part of an application or application already installed. Here, the computer-readable medium 440 may include integrated memory such as a hard drive.

The processing device 430 may be a at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. The processing device 430 may fetch, decode, and execute instructions stored on the computer-readable medium 440 to implement the functionalities described above. In particular, the computer-readable medium 440 may comprise instructions which, when executed, cause the switch 400 to receive a change indication specifying that a change has occurred in a fabric associated with the switch 400, and update a data model 460 based on the received change indication to generate an updated data model. The instructions then cause the switch 400 to filter the updated data model to generate a filtered data model by filtering out portions of the updated data model that an initiator device is not permitted to obtain. Thereafter, the instructions cause the switch 400 to send the filtered data model to the initiator device.

While the above disclosure has been shown and described with reference to the foregoing examples, it should be understood that other forms, details, and implementations may be made without departing from the spirit and scope of the disclosure that is defined in the following claims.

What is claimed is:

1. A method comprising:
    receiving, at a serial attached small computer system interface (SAS) switch and from an initiator device, a serial small computer system interface protocol (SSP) INQUIRY command;
    sending a SSP INQUIRY response to the initiator device, wherein the SSP INQUIRY response comprises an indication that the SAS switch supports bulk discovery;
    receiving a registration request for bulk discovery, wherein the bulk discovery is either on a push basis or pull basis;
    receiving a change indication specifying that a change has occurred in a SAS fabric associated with the SAS switch;
    updating a data model based on the received change indication; and
        if the initiator device is registered for bulk discovery on a push basis, filtering the updated data model, and sending the filtered data model to the initiator device; and
        if the initiator device is registered for bulk discovery on a pull basis, sending the change indication to the initiator device.

2. The method of claim 1, further comprising:
    determining if the initiator device is affected by the change to the SAS fabric; and
    only sending the filtered data model or the change indication to the initiator device if the initiator device is affected by the change to the SAS fabric.

3. The method of claim 1, wherein filtering the updated data model comprises filtering out portions of the updated data model that the initiator device is not permitted to obtain.

4. The method of claim 1, wherein the SAS switch provides the indication to the initiator device that it supports bulk discovery prior to receiving the registration request for bulk discovery from the initiator device.

5. The method of claim 1, wherein, in response to sending the change notification to the initiator device if the initiator device is registered for bulk discovery on a pull basis, the SAS switch (i) receives a request for the updated data model from the initiator device, (ii) filters the updated data model, and (iii) sends the filtered data model to the initiator device.

6. The method of claim 1, wherein the change indication comprises a BROADCAST (CHANGE) primitive.

7. The method of claim 1, wherein the data model comprises a topology map of the SAS fabric.

8. A switch comprising:
    a communication interface; and
    a discovery module to receive a serial small computer system interface protocol (SSP) INQUIRY command from an initiator device;

send a SSP INQUIRY response to the initiator device, wherein the SSP INQUIRY response comprises an indication that the switch supports bulk discovery, wherein the bulk discovery is either on a push basis or pull basis;

receive a registration request for bulk discovery from the initiator device via the communication interface;

receive a change indication specifying that a change has occurred in a fabric associated with the switch;

update a data model based on the received change indication to generate an updated data model;

filter the updated data model to generate a filtered data model; and send the filtered data model to the initiator device via the communication interface.

9. The switch of claim 8, wherein the discover module is to filter the updated data model by filtering out portions of the updated data model that the initiator device is not permitted to obtain.

10. The switch of claim 8, wherein, if the bulk discovery is on the pull basis, the discovery module is to send the change indication to the initiator device prior to sending the filtered data model to the initiator device.

11. The switch of claim 8, wherein the discovery module is further to determine if the initiator device is affected by the change to the fabric associated with the switch, and only send the filtered data model to the initiator device if the initiator device is affected by the change to the fabric.

12. The switch of claim 8, wherein the switch is a SAS switch, and the fabric is a serial attached small computer system interface (SAS) fabric.

13. A non-transitory computer-readable medium comprising instructions which, when executed, cause a switch to:

receive a serial small computer system interface protocol (SSP) INQUIRY command from an initiator device;

send a SSP INQUIRY response to the initiator device, wherein the SSP INQUIRY response comprises an indication that the switch supports bulk discovery, wherein the bulk discovery is either on a push basis or pull basis;

receive a change indication specifying that a change has occurred in a fabric associated with the switch;

update a data model based on the received change indication to generate an updated data model;

filter the updated data model to generate a filtered data model by filtering out portions of the updated data model that the initiator device is not permitted to obtain, wherein the initiator device is registered with the switch for bulk discovery; and send the filtered data model to the initiator device.

14. The non-transitory computer-readable medium of claim 13, wherein if the initiator device is registered with the switch for bulk discovery on the pull basis, the instructions cause the switch to send the change indication to the initiator device prior to sending the filtered data model to the initiator device.

15. The non-transitory computer-readable medium of claim 13, wherein if the initiator device is registered with the switch for bulk discovery on the push basis, the instructions cause the switch to send the filtered data model to the initiator device without sending the change indication to the initiator device.

16. The non-transitory computer-readable medium of claim 13, wherein the switch is a serial attached small computer system interface (SAS) switch, and the fabric is a SAS fabric.

17. The non-transitory computer-readable medium of claim 13, wherein the change indication comprises a BROADCAST (CHANGE) primitive.

* * * * *